US008930941B2

(12) United States Patent
Vorthmann et al.

(10) Patent No.: US 8,930,941 B2
(45) Date of Patent: Jan. 6, 2015

(54) CAPABILITY MODEL FOR DEPLOYING COMPONENTIZED APPLICATIONS

(75) Inventors: Scott A. Vorthmann, Saratoga, CA (US); Daniel J. G. van der Rijn, San Carlos, CA (US); Mark L. Lambert, Menlo Park, CA (US); Laurent H. Domenech, San Jose, CA (US); Michael J. Kanaley, Palo Alto, CA (US); Thomas A. Lucas, legal representative, San Francisco, CA (US)

(73) Assignee: TIBCO Software Inc., Palo Alto, CA (US)

( * ) Notice: Subject to any disclaimer, the term of this patent is extended or adjusted under 35 U.S.C. 154(b) by 12 days.

(21) Appl. No.: 13/117,113

(22) Filed: May 26, 2011

(65) Prior Publication Data

US 2012/0117559 A1 May 10, 2012

Related U.S. Application Data

(60) Provisional application No. 61/348,722, filed on May 26, 2010.

(51) Int. Cl.
*G06F 9/445* (2006.01)

(52) U.S. Cl.
CPC ........................................ G06F 8/60 (2013.01)
USPC ............................ 717/177; 717/174; 717/176

(58) Field of Classification Search
CPC ................ G06F 8/60; G06F 8/61; G06F 8/65
USPC .................................................. 717/168–178
See application file for complete search history.

(56) References Cited

U.S. PATENT DOCUMENTS

| 6,477,572 B1 * | 11/2002 | Elderton et al. .............. 709/224 |
| 6,892,382 B1 * | 5/2005 | Hapner et al. ................ 717/174 |
| 6,986,135 B2 * | 1/2006 | Leathers et al. .............. 717/177 |
| 7,069,553 B2 * | 6/2006 | Narayanaswamy et al. .. 717/173 |
| 7,134,122 B1 * | 11/2006 | Sero et al. ..................... 717/177 |
| 7,210,143 B2 * | 4/2007 | Or et al. ........................ 717/174 |
| 7,228,326 B2 * | 6/2007 | Srinivasan et al. ............ 709/200 |
| 7,318,216 B2 * | 1/2008 | Diab ............................. 717/108 |
| 7,512,942 B2 * | 3/2009 | Brown et al. ................. 717/174 |
| 7,526,764 B2 * | 4/2009 | Fanshier ....................... 717/174 |
| 7,657,887 B2 * | 2/2010 | Kothandaraman et al. ... 717/176 |
| 7,665,085 B2 * | 2/2010 | Sundararajan et al. ....... 717/174 |
| 7,702,740 B2 * | 4/2010 | Srinivasan et al. ............ 709/208 |

(Continued)

OTHER PUBLICATIONS

Rellermeyer et al., "Building, Deploying, and Monitoring Distributed Applications with Eclipse and R-OSGi," Oct. 2007, ACM, p. 50-54.*

(Continued)

*Primary Examiner* — Qing Chen
(74) *Attorney, Agent, or Firm* — Baker & McKenzie LLP

(57) ABSTRACT

Disclosed are systems and methods for deploying a componentized application in a deployment environment using a deployment tool to receive a description of how to deploy the component onto a logical description of the deployment environment, and map the logical description of the deployment environment to the deployment environment based on the mapping data. The deployment tool may receive a component to be deployed in the deployment environment, and automatically deploy the component to the deployment environment. The deployment tool may also generate mapping data including one or more desired attributes of the deployment model based on the description.

21 Claims, 8 Drawing Sheets

(56) References Cited

U.S. PATENT DOCUMENTS

| | | | |
|---|---|---|---|
| 7,770,151 B2* | 8/2010 | Sanjar et al. | 717/109 |
| 7,865,888 B1* | 1/2011 | Qureshi et al. | 717/168 |
| 7,870,550 B1* | 1/2011 | Qureshi et al. | 717/174 |
| 7,900,201 B1* | 3/2011 | Qureshi et al. | 717/174 |
| 7,987,461 B2* | 7/2011 | Agrawal et al. | 717/177 |
| 7,996,814 B1* | 8/2011 | Qureshi et al. | 717/120 |
| 8,001,527 B1* | 8/2011 | Qureshi et al. | 717/120 |
| 8,176,484 B2* | 5/2012 | Sero et al. | 717/177 |
| 8,225,307 B2* | 7/2012 | Baker et al. | 717/174 |
| 8,290,984 B2* | 10/2012 | Vandanapu | 707/796 |
| 8,291,378 B2* | 10/2012 | Arnold et al. | 717/120 |
| 8,296,758 B2* | 10/2012 | Kabadiyski | 717/174 |
| 8,302,093 B2* | 10/2012 | Berg et al. | 717/177 |
| 8,359,590 B2* | 1/2013 | Brannen et al. | 717/166 |
| 2003/0182656 A1* | 9/2003 | Leathers et al. | 717/177 |
| 2003/0192031 A1* | 10/2003 | Srinivasan et al. | 717/120 |
| 2004/0177352 A1* | 9/2004 | Narayanaswamy et al. | 717/169 |
| 2005/0066306 A1* | 3/2005 | Diab | 717/108 |
| 2005/0080801 A1* | 4/2005 | Kothandaraman et al. | 707/100 |
| 2005/0108702 A1* | 5/2005 | Baker et al. | 717/168 |
| 2005/0204354 A1* | 9/2005 | Sundararajan et al. | 717/174 |
| 2006/0041643 A1* | 2/2006 | Fanshier | 709/220 |
| 2006/0184926 A1* | 8/2006 | Or et al. | 717/168 |
| 2006/0206890 A1* | 9/2006 | Shenfield et al. | 717/174 |
| 2006/0230314 A1* | 10/2006 | Sanjar et al. | 714/26 |
| 2007/0028234 A1* | 2/2007 | Sero et al. | 717/174 |
| 2007/0055972 A1* | 3/2007 | Brown et al. | 717/174 |
| 2007/0180018 A1* | 8/2007 | Srinivasan et al. | 709/200 |
| 2008/0021873 A1* | 1/2008 | Agrawal et al. | 707/3 |
| 2008/0072219 A1* | 3/2008 | Kabadiyski | 717/175 |
| 2009/0144729 A1* | 6/2009 | Guizar | 717/176 |
| 2009/0276767 A1* | 11/2009 | Brannen et al. | 717/166 |
| 2010/0031247 A1* | 2/2010 | Arnold et al. | 717/174 |
| 2010/0058331 A1* | 3/2010 | Berg et al. | 717/177 |
| 2010/0100870 A1* | 4/2010 | Vandanapu | 717/121 |

OTHER PUBLICATIONS

Turner et al., "Turning Software into a Service," 2003, IEEE, p. 38-44.*

Sun et al., "Software as a Service: An Integration Perspective," 2007, Springer-Verlag, p. 558-569.*

"SCA Service Component Architecture," Assembly Model Specification; SCA Version 1.0 (Mar. 15, 2007).

Delfino et al., "Open Source SOA with Service Component Architecture and Apache Tuscany," JavaOne Conference (2008).

Universal Resource Locator ("URL") http://www.oasis-opencsa.org/committees.

Universal Resource Locator ("URL") https://www.oasis-open.org/committees/tc_home.php?wg_abbrev=sca-assembly.

* cited by examiner

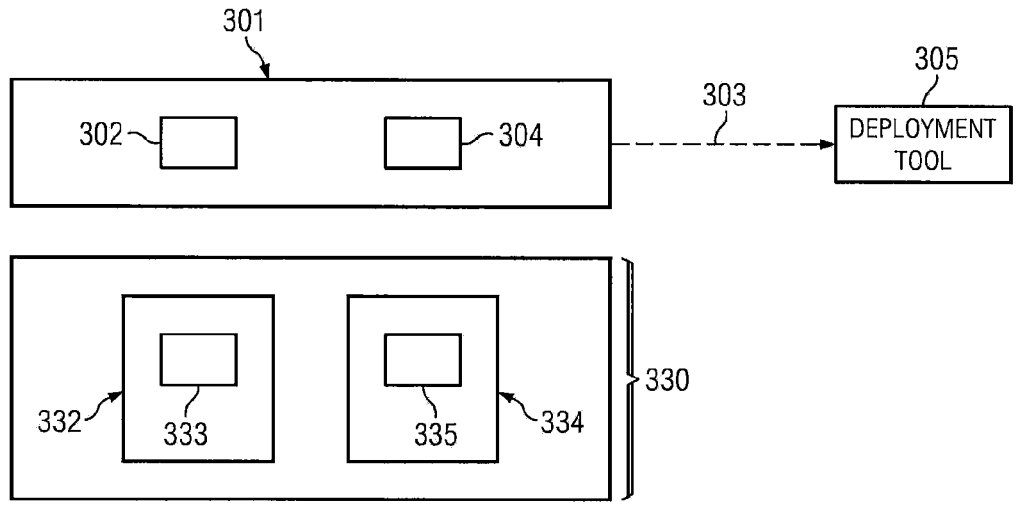
FIG. 3C
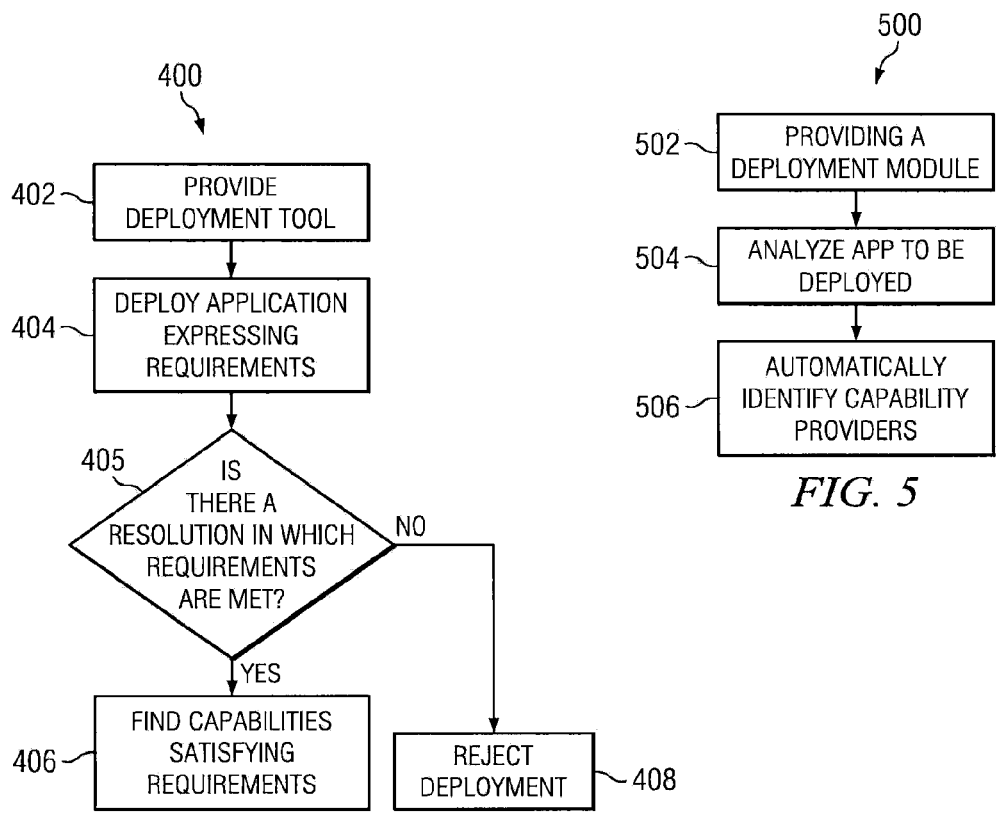
FIG. 4
FIG. 5

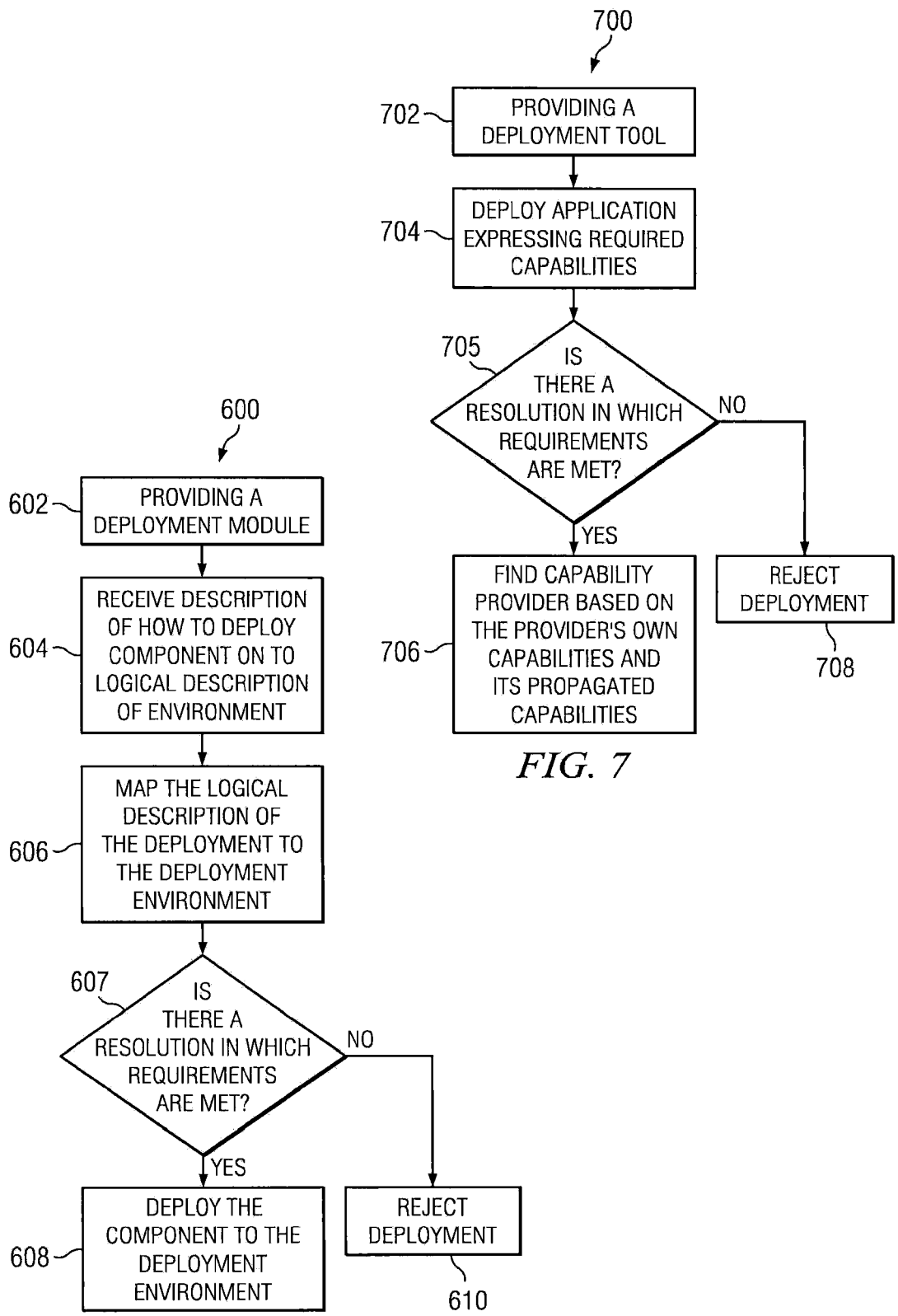

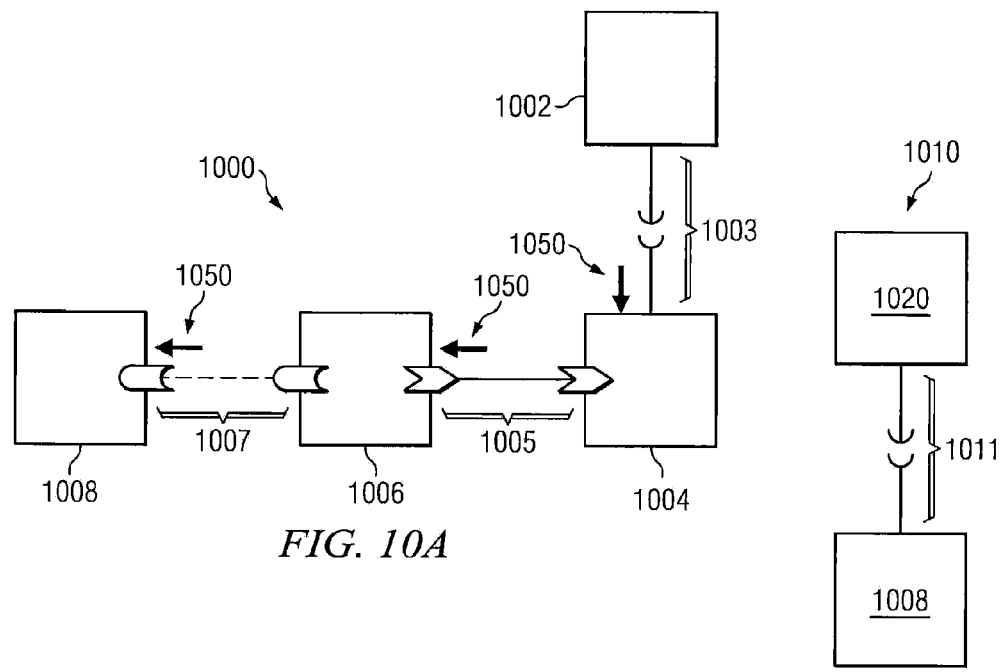
*FIG. 10A*
*FIG. 10B*
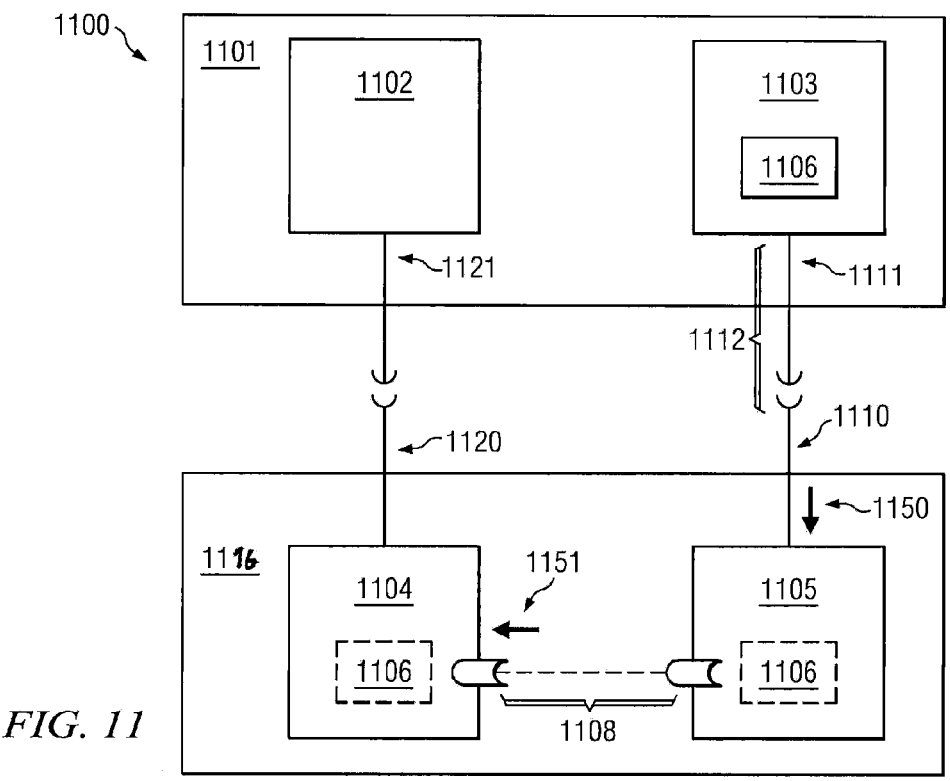
*FIG. 11*

CAPABILITY MODEL FOR DEPLOYING COMPONENTIZED APPLICATIONS

CROSS REFERENCE TO RELATED APPLICATIONS

This application relates and claims priority to U.S. Prov. Pat. App. No. 61/348,722 entitled, "Capability Model for Providing Distributed Deployment of Componentized Applications," filed May 26, 2010, which is herein incorporated by reference.

TECHNICAL FIELD

This disclosure generally relates to a deployment platform for application deployment and, more particularly, relates to a capability model for deploying componentized applications.

BACKGROUND

Typical application servers and deployment environments do not offer good support for modeling and managing dependencies between components of an application. For example, if an administrator of such an environment undeploys application B that is required for the successful function of application A, then the service of application B is interrupted without a dynamic mechanism to continue service of application B. Additionally, a developer typically writes an application that has to run on a particular machine using previously developed software, which creates scalability issues. Further, there are many platforms for building applications, but none of these platforms solve layering problems. Accordingly, interdependencies between applications are not taken into account, and developers and customers of these applications are left on their own to handle these problems. The need has arisen to provide a capability model for deploying componentized applications to address these problems.

SUMMARY

Disclosed are embodiments of systems and methods for deploying a componentized application using a deployment tool to deploy an application expressing a requirement for a first capability associated with a second capability, and to find a first capability provider providing the first capability, where the second capability is provided by a second capability provider, and the second capability is dynamically associated with the first capability provider. The deployment tool may also deploy a plurality of components each expressing one or more requirements for one or more first capabilities associated with one or more second capabilities, find the one or more first capability providers that have acquired the one or more second capabilities for each of the plurality of components where the one or more second capabilities are provided by one or more second capability providers. The deployment tool may also dynamically propagate the second capability from the second capability provider to the first capability provider.

Also disclosed are embodiments of systems and methods for deploying a componentized application using a deployment tool to analyze an application to be deployed, where the application depends on at least two or more deployed capabilities that are interrelated, and the deployed capabilities each provide independent functionality. The deployment tool may automatically identify two or more deployed capability providers that provide the two or more deployed capabilities.

Also disclosed are embodiments of systems and methods for deploying a componentized application in a deployment environment using a deployment tool to receive a description of how to deploy the component onto a logical description of the deployment environment, and map the logical description of the deployment environment to the deployment environment based on the mapping data. The deployment tool may receive a component to be deployed in the deployment environment, and automatically deploy the component to the deployment environment. The deployment tool may also generate mapping data including one or more desired attributes of the deployment model based on the description.

The present disclosure provides several important technical advantages. In certain embodiments, the present disclosure provides mechanisms for hiding the complexity as to how components are interrelated, which allows for the development of a componentized application to be much simpler and effective. Furthermore, the present disclosure also allows for componentized applications to be deployed in a much more efficient, accurate, and automated manner than previous designs. The present disclosure provides mechanisms which allow for applications to have greater scalability while also being able to maintain interrelationships between capabilities provided on one or more application layers. Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

Embodiments are illustrated by way of example in the accompanying figures, in which like reference numbers indicate similar parts, and in which:

FIG. 3C is a schematic diagram illustrating an example system for not deploying a componentized application having capability requirements, in accordance with the present disclosure;

FIG. 4 is a flow diagram illustrating a process for deploying an application, in accordance with the present disclosure;

FIG. 5 is a flow diagram illustrating another process for deploying an application, in accordance with the present disclosure;

FIG. 6 is a flow diagram illustrating a process for deploying a component to a deployment environment using a deployment model, in accordance with the present disclosure;

FIG. 7 is a flow diagram illustrating another process for deploying an application, in accordance with the present disclosure;

FIGS. 10A-B are schematic diagrams illustrating capability propagation, in accordance with the present disclosure; and FIG. 11 is a schematic diagram illustrating another embodiment of capability propagation, in accordance with the present disclosure.

DETAILED DESCRIPTION

Figure 1:
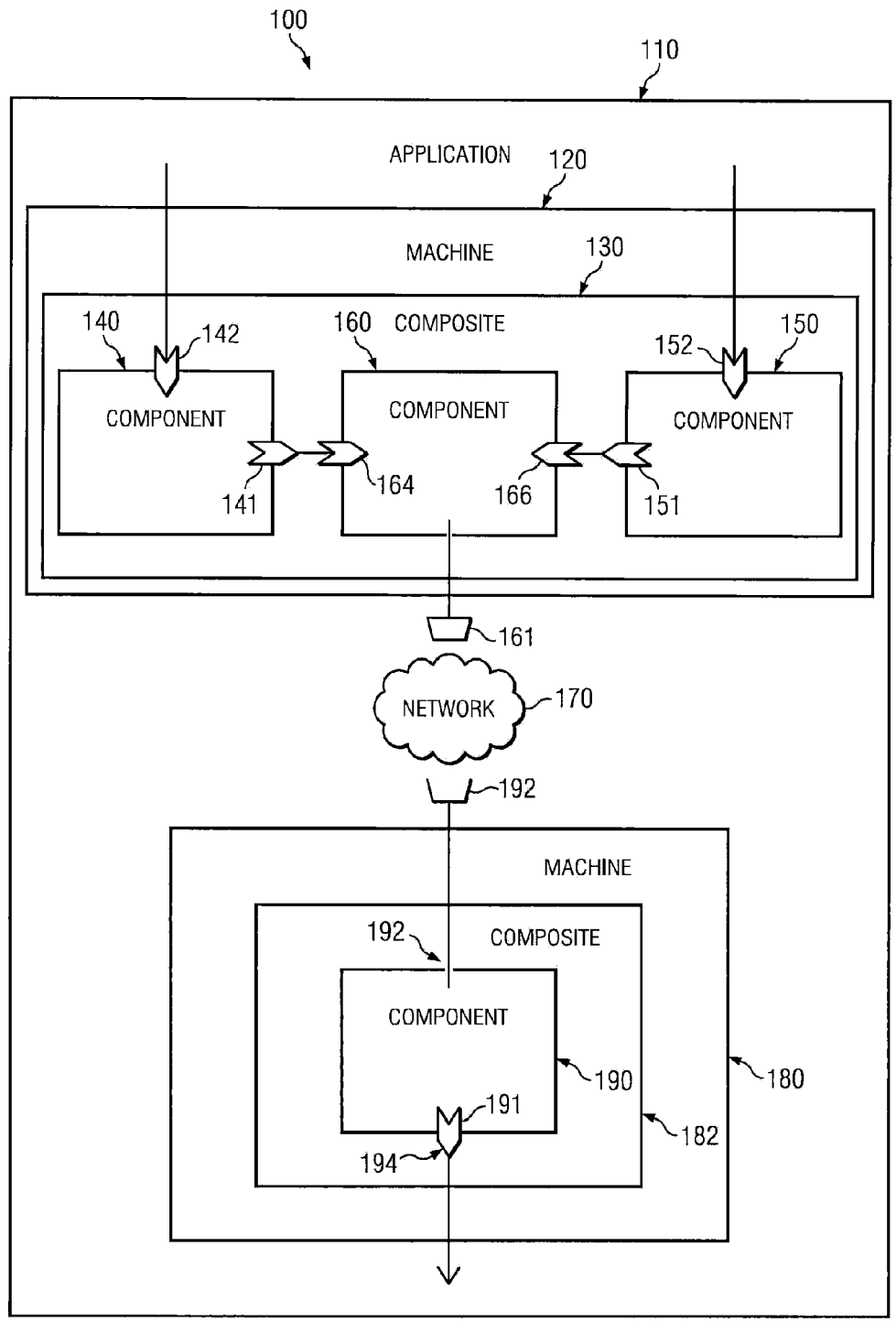
FIG. 1 is a schematic diagram illustrating an example system for deploying a componentized application, in accordance with the present disclosure.

FIG. 1 is a schematic diagram illustrating an example system 100 for deploying a componentized application, in accordance with the present disclosure. According to the illustrated embodiment, system 100 may include a deployed componentized application 110 including a composite 130 running on a machine 120 and a composite 182 running on a machine 180. Composite 130 may include components 140, 150, 160. Composite 182 may include component 190. Component 190 may require a capability 161 provided by component 160.

Componentized application 110 may represent any appropriate combination of logic and/or software suitable to perform a desired function. The application deployment environment is further complicated because well-designed applications may not be monolithic, but rather may be composed of smaller functional units called components 140, 150, 160, 190 (or composites 130, 182), which may be deployed on one or more machines 120, 180. Service Component Architecture ("SCA") is one componentized application environment for describing componentized application 110, which may refer to applications having one or more components. However, any architecture or design environment may be used for designing and describing componentized applications 110 and their capabilities 141, 151, 161, 191. Componentized application 110 may be distributed and deployed on a heterogeneous environment including run-time machines 120, 180.

Machines 120, 180 may store and/or execute components 140, 150, 160, 190 and/or composites 130, 182. Machines 120, 180 may be any suitable computing device comprising a processor and a memory. Machines 120, 180 may comprise one or more machines, workstations, laptops, blade servers, server farms, and/or stand-alone servers. Machines 120, 180 may be operable to communicate with any node or component in system 100 in any suitable manner. Machines 120, 180 may be different kinds or types and may run different operating systems, but machines 120, 180 may still be operable to execute components 140, 150, 160, 190 to provide the functionality for application 110.

Composites 130, 182 may represent any appropriate combination of logic and/or software suitable to perform a desired function. Composite 130 may be composed of one or more smaller functional components 140, 150, 160 located on machine 120. Composite 182 may be composed of a component 190 located on machine 180. Although the embodiment illustrated in FIG. 1 illustrates composite 130 composed of components 140, 150, 160 and composite 182 composed of component 190, any number of components may compose a component, and any number of components and/or composites may compose application 110.

Components 140, 150, 160, 190 may represent any appropriate combination of logic and/or software suitable to perform a desired function. Components 140, 150, 160, 190 of an application 110 may interact in specific ways, according to well-defined contracts. Components 140, 150, 160, 190 may each be the same or different technology, and may be run in the same process, different processes, same machine, or different machines. For example, component 140 may be Java software, component 150 may be C++ software, and component 160 may be COBOL software, but components 140, 150, 160 may still be able to interact and depend on one another by using a common set of abstractions to specify its interactions with one another. Although the embodiment illustrated in FIG. 1 only illustrates components 140, 150, 160 as being located on machine 120, components 140, 150, 160 may each be located on separate machines.

Capabilities 141, 151, 161, 191 may refer to metadata that provides the name of a capability to one or more components in system 100 and the functionality and/or features provided to one or more elements in system 100. Generally, capabilities 141, 151, 161, 191 may refer to metadata that describes the general and/or specific functionality provided by the underlying software in a decoupled manner. By using metadata to describe the capabilities 141, 151, 161, 191 of the general and/or specific functionality provided by the underlying software, an application designer can define and manage interdependencies with one or more other componentized applications providing functionality independent of one another. Further, the application designer may describe many different kinds of relationships using the same language, which obviates the need for whoever deploys the application to understand the intended workings of the system. In certain embodiments, capabilities 141, 151, 161, 191 may be dynamically created at run-time of the application. As described below in more detail in FIG. 2, capabilities 141, 151, 161, 191 may be used to efficiently and properly deploy componentized applications.

Capabilities 141, 151, 161, 191 may also describe interrelationships or dependencies between different capabilities 141, 151, 161, 191, applications 110, machines 120, 180, composites 130, 182, and/or components 140, 150, 160, 190 each having independent functionality. This interrelationship or dependency may be loosely coupled to a particular capability, and not to a particular capability provider, so as not to make particular applications 110, machines 120, 180, composites 130, 182, and/or components 140, 150, 160, 190 tightly coupled. As used herein, a capability provider may refer to any appropriate combination of logic and/or software suitable to provide a desired capability 141, 151, 161, 191. For example, a capability provider may include, but is not limited to, applications 110, machines 120, 180, composites 130, 182, and/or components 140, 150, 160, 190. As described below in more detail in FIGS. 3A, 3B, and 3C, capabilities 141, 151, 161, 191 may be used to deploy applications that depend on at least at least two or more deployed capabilities that are interrelated, where the deployed capabilities each provide independent functionality. For example, capability provider may include metadata describing that it propagates its capabilities through to other capability providers, or a capability provider may include metadata describing that it has certain capabilities provided by other capability providers that propagate to it.

Components 140, 150, 160, 190 may have metadata that describes the capabilities they require 142, 152, 164, 166, 192, and may also have metadata that describes the capabilities they provide 141, 151, 161, 191. Lines between components may represent communications between components 101 in system 100, or any other application-dependent method for providing a capability that satisfies a requirement.

Capabilities 141, 151, 161, 191 allow a component (or application or composite) to precisely or generally indicate the capabilities required without caring about how the capabilities 141, 151, 161, 191 are implemented or communicated. Numerous capability providers may provide the same capability. However, capability providers for a particular capability may each be implemented in different ways (e.g., capability providers may be implemented on different machines, or capability providers may be implemented in a more simple or complicated fashion than other capability providers). Additionally, capability providers and/or capabilities may be interrelated with other capability providers (or be interrelated with other capabilities) in different ways.

Dependencies (and the capabilities that represent them) can take on several forms. For example, an application A may act as a container or factory for an application B, where application A may take responsibility for the creation, initialization, and shutdown of application B. Another dependent relationship is the extension point where an application A may extend application B, which adds customization or additional functionality to application B. These different types of dependent relationships may imply different constraints for deploying and managing the applications, so the metadata must treat them as different kinds of capabilities. These different types of dependent relationships are discussed below in more detail in FIGS. 8, 9, 10, and 11.

Network 170 may represent any form of communication network supporting circuit-switched, packet-based, and/or any other suitable type of communications between applications 110, machines 120, 180, composites 130, 182, and/or components 140, 150, 160, 190. Network 170 may additionally include any other nodes of system 100 capable of transmitting and/or receiving information over a communication network. Although shown in FIG. 1 as a single element, network 170 may represent one or more separate networks (including all or parts of various different networks) that are separated and serve different respective elements illustrated in FIG. 1. Network 170 may include routers, hubs, switches, firewalls, content switches, gateways, call controllers, and/or any other suitable components in any suitable form or arrangement. Network 170 may include, in whole or in part, one or more secured and/or encrypted Virtual Private Networks (VPNs) operable to couple one or more network elements together by operating or communicating over elements of a public or external communication network. In general, network 170 may comprise any combination of public or private communication equipment such as elements of the public switched telephone network (PSTN), a global computer network such as the Internet, a local area network (LAN), a wide area network (WAN), or other appropriate communication equipment. In some embodiments, application 110 may exist on the same machine, which may obviate the need for any network communications.

Figure 2:
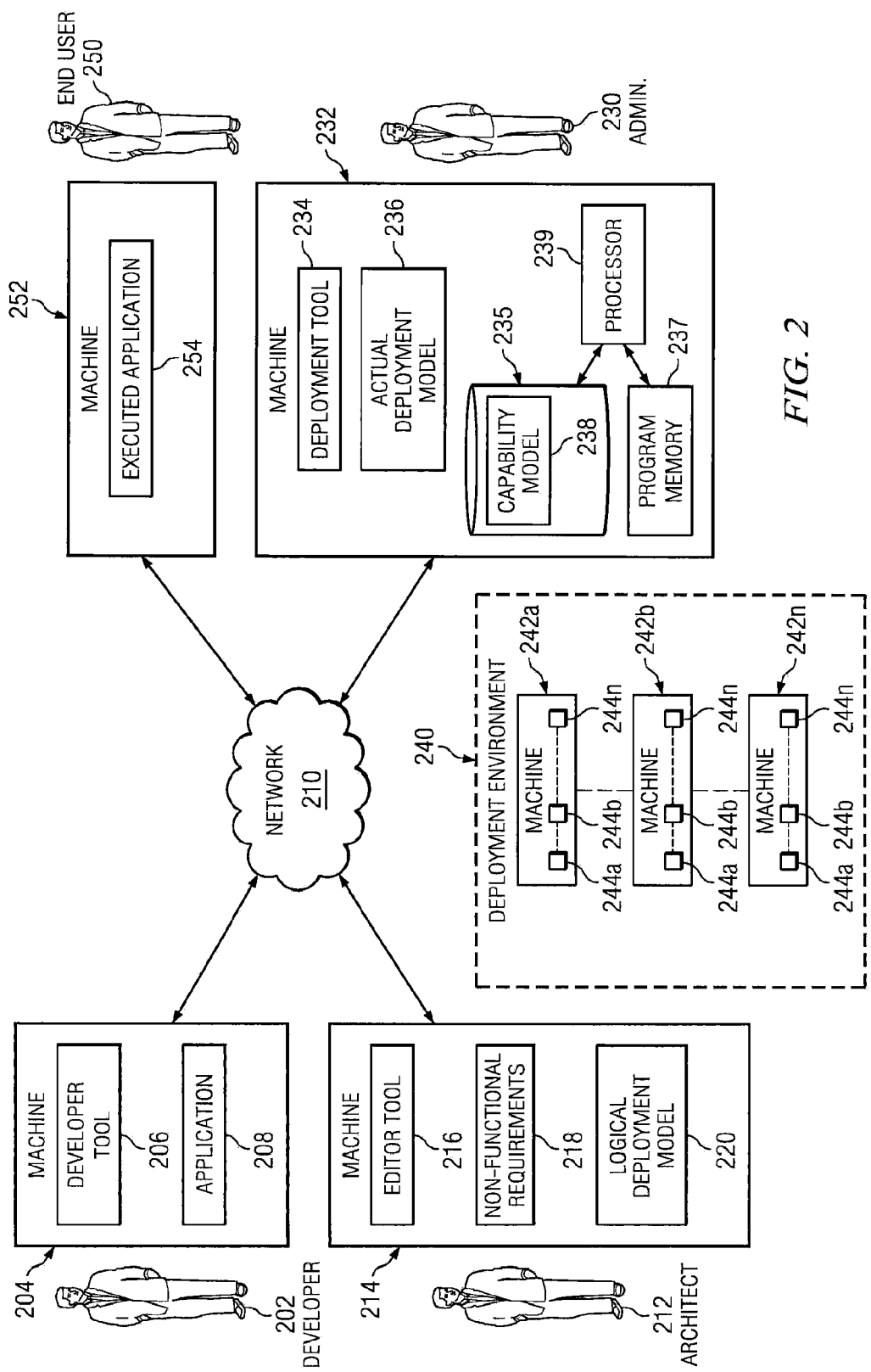
FIG. 2 is a schematic diagram illustrating an example system for developing and deploying componentized applications, in accordance with the present disclosure.

FIG. 2 is a schematic diagram illustrating an example system 200 for developing and deploying componentized applications, in accordance with the present disclosure. According to the illustrated embodiment, system 200 may include a developer 202 who may use a developer tool 206 to write a componentized application 208, an architect who may use an editor tool 216 to write the nonfunctional requirements 218 for each component in componentized application 208 and to write a logical deployment model 220, an administrator 230 who may use a deployment tool 234 to automatically deploy componentized application in a deployment environment 240, and an end user 250 who may execute the deployed application 254. Deployment tool 234 may determine how to deploy componentized application 208 based on an actual deployment model 236 and a capability model 238. Deployment environment 240 may include one or more machines 242a-242n ("242"), which store one or more previously deployed componentized applications 244a-244n (244). An advantage for componentizing applications is that the different componentized applications (or components) 244 may be distributed to different application servers, which allows for the separation of the functionality provided by the application, the deployment and scalability requirements, and the actual deployment of the componentized application.

Developer 202 may refer to a person or a collection of people who may write the software of the componentized application 208. Developer 202 may also write the metadata (e.g., a description of the required capabilities of preexisting components) associated with application or component 208. Developer 202 may be able to create componentized application 208 in a decoupled fashion because developer 202 is not responsible for and does not care how the application 208 is deployed and executed or how it interacts or communicates in the deployment environment 240. Accordingly, developer 202 may be more efficient in creating componentized application 208 because developer 202 does not care what machine it is running on or how another component gets its data. Further, developer 202 does not have to worry about coding for different sets of technology. Rather, developer 202 may write componentized application 208 in whichever technology developer is most skilled (e.g., developer may be specialist in SQL, Java, or C++, etc.).

Machine 204 may be any suitable computing device to perform the described functionality. Developer tool 206 may represent any appropriate combination of logic and/or software suitable to create a componentized application 208. Developer tool 206 allows for developer 202 to create applications 208 requiring capabilities that may be interrelated to one or more additional capabilities. For example, developer tool 206 is operable to add a piece of metadata called "through" that may allow a first particular capability provider to take any capabilities that it gets via a second capability provider where the first capability provider offers its capability along with the second capability provided by the second capability provider. In another example, developer tool 206 is operable to add a piece of metadata called "with" that may allow an application to define a relationship requirement that a capability be associated with another capability where the first capability may be provided by a first capability provider and a second capability may be provided by a second capability provider. System 200 allows for developer 202 to encode some kind of dependency requirement between capabilities and capability providers.

Componentized application 208 may represent any appropriate combination of logic and/or software suitable to perform a desired function. Componentized application 208 may be loosely coupled to other capability providers. For example, componentization application 208 may define a minimum set of requirements to describe the type of data to be received from a capability provider. Previously, a developer 202 had to write an application that had to run on a particular machine, and the software does not scale. System 200 allows developer 202 to create a componentized application 208 without having to worry about scalability or using a particular technology. Componentized application 208 may be transmitted via network 210 to deployment tool 234 on machine 232.

Network 210 may represent any form of communication network supporting circuit-switched, packet-based, and/or any other suitable type of communications between machines 204, 214, 232, 242, 252 and any other elements in FIG. 2. Network 210 may additionally include any other nodes of system 100 capable of transmitting and/or receiving information over a communication network. Although shown in FIG. 2 as a single element, network 210 may represent one or more separate networks (including all or parts of various different networks) that are separated and serve different respective elements illustrated in FIG. 2. Network 210 may include routers, hubs, switches, firewalls, content switches, gateways, call controllers, and/or any other suitable components in any suitable form or arrangement. Network 210 may include, in whole or in part, one or more secured and/or encrypted Virtual Private Networks (VPNs) operable to couple one or more network elements together by operating or communicating over elements of a public or external communication network. In general, network 210 may comprise any combination of public or private communication equipment such as elements of the public switched telephone network (PSTN), a global computer network such as the Internet, a local area network (LAN), a wide area network (WAN), or other appropriate communication equipment. In some embodiments, network 210 may not be used if all of the components are located on the same machine.

Architect 212 may refer to a person or a collection of people who may determine how they want their application distributed and also model a logical environment in which it will be distributed. For example, architect 212 may create a description 218 of the non-functional requirements for each component and/or a logical deployment model 220 defining the logical deployment environment which may describe the actual or desired attributes of a physical deployment environment 240.

Machine 214 may be any suitable computing device to perform the described functionality. Editor tool 216 may represent any appropriate combination of logic and/or software suitable to create a list 218 of non-functional requirements for each component and a logical deployment model 220.

Description 218 of non-functional requirements for each component may be an artifact or any suitable type of data for describing the non-functional requirements of the deployment environment where each component of application 208 is to be deployed. Description 218 allows for architect 212 to ensure that application 208 runs smoothly and is scalable when deployed even though said architect may not have any knowledge regarding the actual hardware located in deployment environment 240. Essentially, description 218 defines all the non-functional requirements (i.e., the requirements not associated with the functionality provided by the application) that may be associated with deployment environment 240. Non-functional requirements include, but are not limited to, scalability, disaster recovery, location, security, auditing, and performance. For example, auditing may be non-repudiation of two different entities in which the entities want to have a protocol and a record that the transaction occurred.

Logical deployment model 220 may be an artifact or any suitable type of data that defines a type of node having certain attributes for particular components to be deployed. Logical deployment model 220 may logically describe the hardware, software, and network topology of deployment environment 240 (e.g., processing machines, storage machines, machines in two different locations over 1,000 miles apart, etc.) without knowing the exact hardware, software, operating systems, or network associated with the deployment environment 240. Architect 212 may be able to create whatever kind of topology necessary to logically describe the types of attributes required for a particular component to be deployed. For example, logical deployment model 220 may include tier 1 nodes (e.g., machines or application servers, etc.), tier 2 nodes, and tier 3 nodes, each having attributes defined by architect. Tier 1 can be defined as broadly or specifically as needed. For example, tier 1 node may be defined as having a fast machine or a lot of memory, or can be more specific and be defined as having at least 300 gigabytes of RAM running a particular version of software developed by a particular vendor. In other example, a particular set of nodes may require that a machine have low latency communications with a particular system. Another set of nodes may require an attribute defined by a particular geographic location. Previously, architect 212 may have had to orally communicate with an administrator with respect to deploying each application. Description 218 of non-functional requirements for each component and logical deployment model 220 encode and automate the deployment instructions to deployment tool 234 and/or administrator 230 for effectively deploying application in a deployment environment.

Administrator 230 may manage deployment environment and may manage the deployment of application 208. In some embodiments, administrator 230 may receive application 208 from developer 202, and description 218 of non-functional requirements for each component along with logical deployment model 220 from architect 212. In some embodiments, a file including application 208, description 218 of non-functional requirements for each component, and/or logical deployment model 220 may be transmitted together.

Machine 232 may be any suitable computing device comprising a processor 239 and a memory 237 to perform the described functionality. Machine 232 may comprise one or more machines, workstations, laptops, blade servers, server farms, and/or stand-alone servers. Machine 232 may include any hardware and/or controlling logic used to communicate information to and from one or more elements illustrated in FIG. 2. For example, machine 232 may be operable to receive and process data of different types that may be transmitted via different protocols or formats. Other elements in FIG. 2 may also comprise hardware and/or controlling logic to communicate information to and from one or more elements illustrated in FIG. 2.

Deployment tool 234 or deployment module may represent any appropriate combination of logic and/or software suitable to perform the described functions. Deployment tool 234 may be used to automate the deployment of applications 208 to certain elements or nodes in system 200, rather than requiring administrator 230 to manually deploy the applications. For example, deployment tool 234 may perform one or more of the following steps: receive a component to be deployed in the deployment environment 240; receive a description 218 of how to deploy a component onto a logical description 220 of the deployment environment; generate mapping data including one or more desired attributes of the deployment model 220 based on the description 218; map the logical description of the deployment environment 220 to the deployment environment 240 based on the mapping data; and automatically deploy the component 208 to the deployment environment 240. Accordingly, deployment tool 234 may ensure that application 208 will be properly deployed or else it may prevent deploying application 208. For example, there may be license restrictions that certain applications cannot be placed in certain geographic locations, and this non-functional requirement may be described in the description 218 of the non-functional requirements for each of these applications. Deployment tool 234 may ensure that these applications 208 are never deployed to nodes located in the restricted geographic areas, and that these applications never access a capability provider located in the restricted geographic areas. When administrator 230 receives a new application 208, administrator 230 may simply drag and drop the application 208 into deployment tool 234, which automatically distributes application 208 to the deployment environment 240.

Deployment tool 234 may also have a resolution algorithm which may analyze the deployed components to determine if they have the capabilities required by the newly deployed application 208. Deployment tool 232 may also rely on additional metadata (e.g., a capability related with another capability, or a capability that propagates through or with a separate capability provider, etc.). Deployment tool 232 may also be able to dynamically determine the capabilities required and the interrelationship of capabilities deployed (or attempted to be deployed) at the time of the attempted deployment of application 208. For example, deployment tool 234 may analyze an application 208 to be deployed, where the application 208 depends on at least two or more deployed capabilities that are interrelated and provide independent functionality, and deployment tool 234 may automatically identify two or more deployed capability providers that provide the two or more deployed capabilities. In another example, deployment tool 234 may deploy an application 208 that requires a particular capability that is associated with another particular capability, and find a particular capability provider that provides the first particular capability that is associated with the second particular capability provided by a different capability provider where the second particular capability is dynamically associated with the first capability provider.

Actual deployment model 236 may be an artifact or any suitable type of data that lists an inventory of all the actual nodes in deployment environment 240 and all the attributes of the nodes (e.g., location, number of machines, software, etc.). In some embodiments, the logical mapping of the logical description of the machines 242 (e.g., these actual machines are tier 1 nodes, and these actual machines are 1,000 miles away) may have come first and then a list of the actual equipment 242 may have been created, such that the logical deployment model 220 may have preceded the actual deployment model 236. In some embodiments, the actual deployment model 236 of the deployment environment 240 may have preceded the creation of logical deployment model 220.

Capability model 238 may be an artifact or any suitable type of data that describes capabilities provided by deployed capability providers, and the interrelationships of capabilities. Capability model 238 may be dynamically modified to include additional capabilities or interrelationships of capabilities when a new component is deployed. In some embodiments, deployment tool 234 may analyze application 208 and dynamically update capability model 238 with the additional capabilities or interrelationships of capabilities when application 208 is deployed. In some embodiments, capability model 238 may be stored in a database 235 or memory 237.

Memory 237 may store processor instructions, deployment tool 234, actual deployment model 236, capability model 238, and/or any other suitable information. Memory 237 may comprise any collection and arrangement of volatile and/or non-volatile components suitable for storing data. For example, memory 237 may comprise random access memory (RAM) devices, read only memory (ROM) devices, magnetic storage devices, optical storage devices, and/or any other suitable data storage devices. In particular embodiments, memory 237 may represent, in part, computer-readable storage media on which computer instructions and/or logic are encoded. Although shown in FIG. 2 as a single component, memory 237 may represent any number of memory components within, local to, and/or accessible by processor 237.

Processor 239 may represent and/or include any form of processing component, including general purpose computers, dedicated microprocessors, or other processing devices capable of processing electronic information. Examples of processor 239 include digital signal processors (DSPs), application-specific integrated circuits (ASICs), field-programmable gate arrays (FPGAs), and any other suitable specific or general purpose processors. Although FIG. 2 illustrates a single processor 239 in machine 232, machine 232 may include any suitable number of processors 239.

Deployment environment 240 may represent all of the actual machines 242 (e.g., application servers), software, network components, and any other suitable nodes where application 208 may be deployed. Previously deployed capability providers providing capabilities 244 are also located in deployment environment 240.

End user 250 may refer to a person who utilizes the functionality provided by a deployed and executed application 254. For example, end user 250 may utilize application 254 on machine 252 where application 254 may be running on multiple components each located on different machines located in different geographic areas.

Figure 3A:
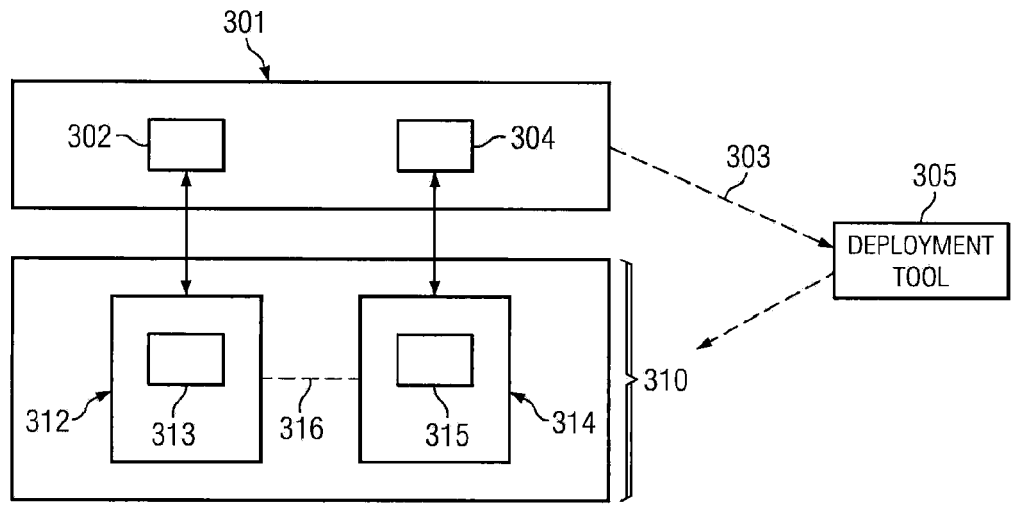
FIG. 3A is a schematic diagram illustrating an example system for deploying a componentized application having capability requirements, in accordance with the present disclosure.

FIG. 3A is a schematic diagram illustrating an example system for deploying a componentized application 301 having capability requirements, in accordance with the present disclosure. According to the illustrated embodiment, system may include a componentized application 301 to be deployed where componentized application may include a composite 302 requiring a capability 313 and a composite 304 requiring a capability 315. Application 301 may be further defined to require that capability 313 and capability 315 have an interrelationship with one another. Capability provider 312 may provide capability 313. Capability provider 314 may provide capability 315. Capability 313 and capability 315 may be interrelated with a relationship 316 between capability provider 312 and capability provider 314.

In some embodiments, deployment tool 305 may be operable to deploy application 301 expressing a requirement 303 for a first capability 313 associated or interrelated with a second capability 315, and the deployment tool may be further operable to find a first capability provider 312 providing the first capability 313 that is associated with the second capability 315 that is provided by a second capability provider 314. In some embodiments, deployment tool may be further operable to deploy application expressing these requirements when the second capability 315 is dynamically associated with the first capability 313. For example, first capability 313 and second capability 315 may not have a relationship or be interrelated with one another until the attempted deployment of application 301, which may attempt to deploy a component or an application 301 that dynamically causes a relationship or interrelatedness to occur. Accordingly, deployment tool 305 may dynamically determine that the first capability 313 is dynamically associated with second capability provider 314, or deployment tool 305 may dynamically determine that the second capability 315 is dynamically associated with the first capability provider 312. A dynamic association or interrelationship between capabilities (or between capabilities and other capability providers) can be created by metadata describing a particular capability provider. For example, a capability provider may include metadata describing that it propagates its capabilities through to other capability providers, or a capability provider may include metadata describing that it has certain capabilities provided by other capability providers that propagate to it.

In some embodiments, deployment tool 305 may be operable to analyze an application 301 to be deployed, where the application 301 depends on at least two or more deployed capabilities 313, 315 that are interrelated, where the deployed capability providers (e.g., components 312, 314) each provide independent functionality. Deployment tool 305 may be further operable to automatically identify two or more deployed capability providers 312, 314 that provide the two or more deployed capabilities 313, 315 that are interrelated.

For example, capability provider 312 may provide a chat capability 313 developed by a particular developer. Capability provider 314 may provide a games capability 315 developed by another developer. Games capability 315 may include certain features like high score lists and relative rankings. Chat capability 313 may include certain features like ability to chat or send messages to friends. Application 301 may be developed for a card game in a chat room setting that requires the games capability 315 and the chat capability 313. Application may further be defined to require that the games capability 315 and chat capability 313 are interrelated. For example, application 301 may want to have its games capability 315 rely on the same set of users as its chat capability 313, which may require an interrelationship between the games capability 315 and chat capability 313. Accordingly, the high score lists associated with the games capability 315 may only include the users located in the same chat room provided by the chat capability 313. Thus, even though component 312 and component 314 provide separate capabilities and were developed independently of one another, a developer can interrelate these capabilities and require that components provide these capabilities only if the components are able to provide interrelated capabilities.

In some embodiments, deployment tool 305 may ensure that application 301 is never deployed unless some capability exists that is required for component 302 and some separate capability exists that is required for component 304. Further, if application 301 is written with metadata that defines that these two capabilities have independent functions and must also be interrelated in some way, then deployment tool 305 may ensure that application 301 is never deployed unless these capabilities having independent functions are also interrelated. In some embodiments, the interdependencies among many components or applications may be stated in a decoupled fashion via capabilities, which may form a directed acyclic graph where any given application may require and/or provide several capabilities.

A relationship between two capabilities may include, but is not limited to, the following relationships: located in same country, same version, operating in same set of users; sharing the same inventory in the same memory; and/or the ability that the capabilities (or capability providers) can communicate with each other (even if numerous other capability providers are located between these capabilities). For example, a server may host many applications, including multiple versions of some applications, and there may be more than one capability provider of a given capability. However, only certain of these capabilities and/or capability providers) may include metadata that interrelates the particular capability to another capability or another capability provider. For example, the same component that provides a capability of an inventory report may be located on the cloud, and may be used by two different competing customers. An application for company X may want to call only the inventory report components that are linked or related to a memory storing the inventory of company X, and an application for company Y may want to call only the inventory report components that are linked to a memory storing the inventory of company Y. With respect to the application for company X, deployment tool 305 is operable to only access components interrelated to a capability having access to the memory storing the inventory of company X. With respect to the application for company Y, deployment tool 305 is operable to only access components interrelated to a capability having access to the memory storing the inventory of company Y. If these relationships are not established yet, deployment tool should give an error so that the data is not shared between competitors.

Figure 3B:
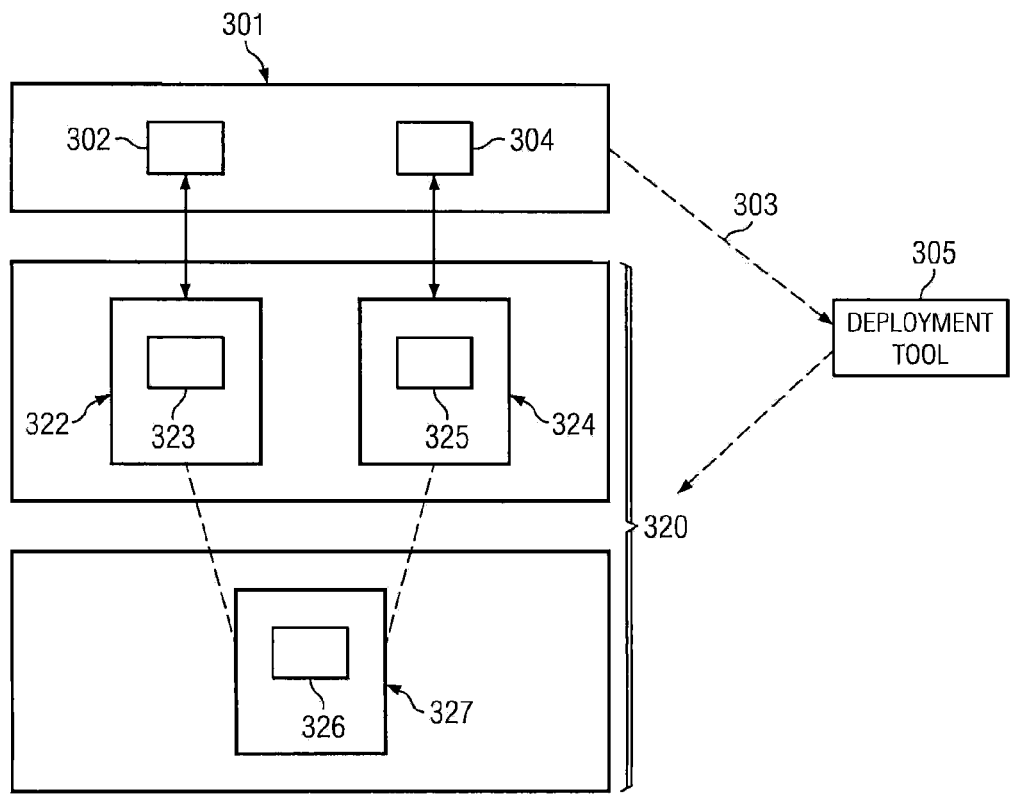
FIG. 3B is a schematic diagram illustrating an example system for deploying a componentized application having capability requirements, in accordance with the present disclosure.

FIG. 3B is a schematic diagram illustrating an example system for deploying a componentized application having capability requirements, in accordance with the present disclosure. FIG. 3B is identical to FIG. 3A with the exception that a component 326, which is defined on another layer than components 312, 324, provides the necessary relationship (and propagation path) between components 312, 324.

Deployment tool 305 may be able to determine that there is a propagation edge that will flow through the components 302, 304, 312, 324 if these components are deployed (or attempted to be deployed). Metadata associated with component 326 may provide the propagation, and deployment tool 305 may determine if the propagation is throughout all the necessary components when the application 301 is deployed. Deployment tool 305 may identify a relationship (or propagation path) between the two components 312, 314 even if the relationship is provided by a third component 326 on a third layer. By hiding this complexity as to how the components are interrelated from application 301, development of application 301 is much simpler and effective.

In another example, capability 325 illustrated as originating in capability provider 324 may have originally been provided by capability provider 304, which may have included metadata to propagate capability 325 from capability provider 304 to another capability provider (e.g., capability provider 324). In this example, deployment tool 305 may dynamically recognize this propagation metadata in capability provider 304 when it attempts to deploy application 301 having capability provider 304. Thus, deployment tool 305 may identify a relationship between two capability providers or capabilities even if this relationship is not created until the a capability provider within application is attempted to be deployed.

FIG. 3C is a schematic diagram illustrating an example system for not deploying a componentized application having capability requirements, in accordance with the present disclosure. As discussed above, FIG. 3C is identical to FIG. 3A with the exception that capability 333 and capability 335 are not interrelated In such a scenario, application 301 may not function correctly, and deployment tool 305 may prevent deployment of application 301 because deployment tool 305 may not be able to locate the required capabilities that are also interrelated. Further, if application 301 were to be deployed, it may encounter a run-time error since it may not be able to locate the two required capabilities that are interrelated. Therefore, deployment tool 305 provides the benefit of preventing application 301 from being deployed, which will prevent problems from occurring with the performance of application 301.

Returning to the example of the card game application, which requires a games capability and a chat capability that are interrelated, the card game application may not function properly if the application depends on a games capability and a chat capability that are not interrelated. For example, the developer of the card game application may desire for the high scores to only include the high scores of the participants in the chat room. However, if the games capability and the chat capability do not have this interrelationship, the high scores may include the universe of all users (including non-participants in chat room) because the games capability is not related to the chat capability, which may provide the list of participants in chat room.

FIG. 4 is a flow diagram illustrating a process 400 for deploying an application. The process includes providing a deployment tool at action 402, and deploying an application expressing a requirement for a first capability associated with a second capability at action 404. At action 405, the deployment tool may determine if there is a resolution in which the requirements are met for a first capability associated with a second capability.

If the deployment tool determines that there is a resolution in which the requirements are met for a first capability associated with a second capability, the flow diagram moves to action 406 in which deployment tool finds a first capability provider providing the first capability that is associated with the second capability. The second capability is provided by a second capability provider. Further, capabilities are dynamically associated when they join the deployment environment. If there is not a resolution at action 405, the deployment is rejected at action 408.

In an embodiment, the application may include one or more components. Thus, the process 400 may further include deploying one or more components at action 402. The process 400 may further include deploying a plurality of components at action 402. Each of these components may express requirements for first capability providers associated with second capabilities. The process 400 may further include finding the first capability providers associated with the second capabilities for each of the plurality of components. The second capabilities are provided by second capability providers.

The process 400 may further include dynamically associating capabilities when they are added to the deployment environment. The process 400 may also include deploying a new capability provider that provides an association between the first and second capability. The new capability provider may add dynamic metadata to the first capability provider and the second capability provider to effect the association.

The first and second capability providers may be functionally independent, and may be located at different application layers. Thus, the first and second capability providers may be located at different application layers.

FIG. 5 is a flow diagram illustrating another process 500 for deploying an application. The process 500 may include providing a deployment module at action 502, analyzing an application to be deployed at action 504, and automatically identifying capability providers for the application deployment at action 506. The application depends on at least two or more deployed capabilities that are interrelated but provide independent functionality. And the identified capability providers provide the two or more deployed capabilities.

The application and the capability providers may comprise one or more components. Further, in some embodiments, the first capability provider may be located at a different application layer than the second capability provider.

The process 500 may also include providing a third capability provider providing the interrelationship between the deployed capability providers.

The process 500 may further include providing a capability model stored in a data storage element. The capability model may include information relating to the interrelationship between the deployed capability providers. The deployed capability providers and the deployed capabilities may be interrelated dynamically.

FIG. 6 is a flow diagram illustrating a process 600 for deploying a component to a deployment environment using a deployment model. The process 600 includes providing a deployment module at action 602, receiving a description of how to deploy the component onto a logical description of the deployment environment at action 604, mapping the logical description of the deployment environment to the deployment environment based on the mapping data at action 606.

At action 607, the process may determine if there is a resolution in which the requirements are met for deploying a component to an appropriate deployment environment. If the process determines that the requirements are met, the component is automatically deployed to the deployment environment at action 608. If the process determines that the requirements are not met, the component may be prevented from deploying to the deployment environment. For example, process may prevent deployment of the component if the deployment module cannot determine machines in the deployment environment having the one or more attributes.

The process may further include receiving a component to be deployed in the deployment environment at action and generating mapping data including desired attributes of the deployment model based on the description at action.

The description may include attributes required of one machines for the component, and the component may be automatically deployed to machines in the deployment environment having the attributes.

The deployment environment may be a single machine, a networked computing environment, a cloud computing environment, or a distributed computing environment.

The desired attributes may include scalability requirement including, but not limited to, processing speed, a fast machine, a machine having over three GHz of processing power, a memory size, connection speed with another node, geographic location, a particular type of operating system, a virtual machine, a particular type of database, compatibility information, security features, and auditing features.

FIG. 7 is a flow diagram illustrating another process 700 for deploying an application. The process may include providing a deployment tool at action 702, deploying an application expressing required capabilities at action 704, and finding a capability provider for the application based on the provider's own capabilities and capabilities that are propagated to the capability provider at action 706. At action 705, whether a resolution in which the requirements are met is determined. If there is a resolution at action 705, the capabilities satisfying the requirements are found and the deployment is continued at action 706. If not, the deployment is rejected at action 708.

Propagation Mechanisms

As discussed above, capabilities may be associated with other capabilities. For example, a capability model may model the capability and capability provider associations available in a plurality of application layers. A deployment tool may deploy an application on a certain application layer (or set of application layers) based on what capabilities might be available at that layer(s).

In some embodiments, a capability may be propagated from one capability provider to another capability provider. A capability model may model the propagated capabilities and the capability providers available in the plurality of application layers. A deployment tool may deploy an application at a certain component based on both the component's capabilities and the component's propagated capabilities.

In some embodiment, a capability propagation mechanism may be provided. A capability propagation mechanism provides the decoupling and the robustness for distribution and deployment. The capability propagation mechanism is rich enough to describe, for example, that a base application layer uses not only that application, but the application as extended by particular other applications providing custom workflow tasks or other deployed data and/or behaviors. For example, a business process management application may use not only the business process management engine (application), but that engine extended by particular other applications providing custom workflow tasks or other deployed data and behaviors. The business process management application may provide basic work flow engine and other basic capabilities. But, the work flow engine is extensible. Specific workflow processes may be deployed to it and the work flow engine may also be extended with custom activities and custom tasks (e.g., send an e-mail, call java code, etc.). An architect may create additional applications that build workflow in and customize the applications to do specific things. So, in the business process management scenario, for a given workflow process, an application may seek to use the workflow engine, but may also seek to use a workflow engine extended by a custom task. In addition, the capability of a custom task or application deployed in the same environment with the workflow engine may propagate to the workflow engine so now the capability can be satisfied by the workflow engine, too, allowing for richer relationships.

The propagated capabilities may be effected via multiple propagation mechanisms including, but not limited to, service/reference relationships, factory relationships, and/or component extension points. These relationships are discussed in more detail below.

Figure 8A:
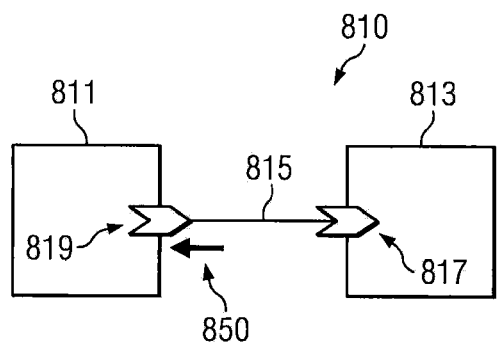
FIGS. 8A-8C are schematic diagrams illustrating a variety of propagation mechanisms, in accordance with the present disclosure.

FIG. 8A is a schematic diagram illustrating a service/reference relationship for composite 810 for propagating capabilities. Component 811 uses a service 817 provided by component 813 resulting in reference 819. Thus, component 811 is wired to component 813. Composite 810 has a composite application description which may specify that any capabilities provided by component 813 should be propagated to component 811. The reference 819 provides the propagation 850 of capabilities from component 813 to component 811. Alternatively, the deployment tool may incorporate metadata that describes that such service/reference wires are propagation edges.

Figure 8B:
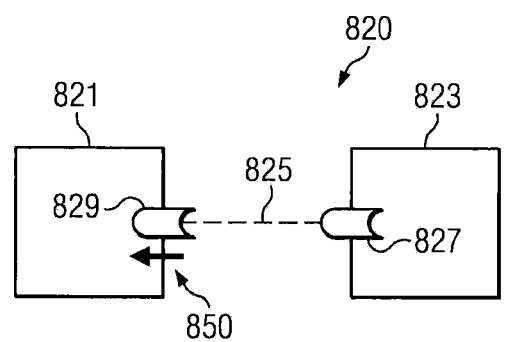

FIG. 8B is a schematic diagram illustrating a extension point relationship for component group 820 for propagating capabilities. Component 821 is extensible and has an extension point 829. Component 823 may be an extension of component 821 and may be dynamically attached 825 to the extension point 829 via extension 827. Component 821 can thus offer an extension point 829, and also can acquire capabilities of component 823 (or other extensions). In an embodiment, component 821 states in metadata that it acquires capabilities of component 823. Accordingly, capabilities of component 823 are propagated 829 to the component 821. Alternatively, the deployment tool may incorporate metadata that describes that such extensions of extension points are propagation edges.

Figure 8C:
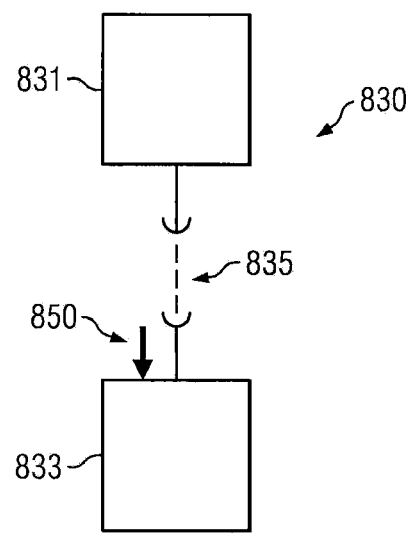

FIG. 8C is a schematic diagram illustrating a factory relationship for factory group 830 for propagating capabilities. Component 833 defines a factory, which is a generic, data-driven component. Component 831 is data deployed as a component. The data of component 831 may include capabilities for configuring component 833, but because component 831 is data, component 831 has no run-time and, thus, would not have a reference to a service, or the ability to provide a service itself. When component 831 is deployed, component 833 acquires capabilities of component 831 (at 835) resulting in a propagation 850 of capabilities provided by component 831 to component 833. Alternatively, the deployment tool may incorporate metadata that describes that such factory relationships as propagation edges.

Figure 9:
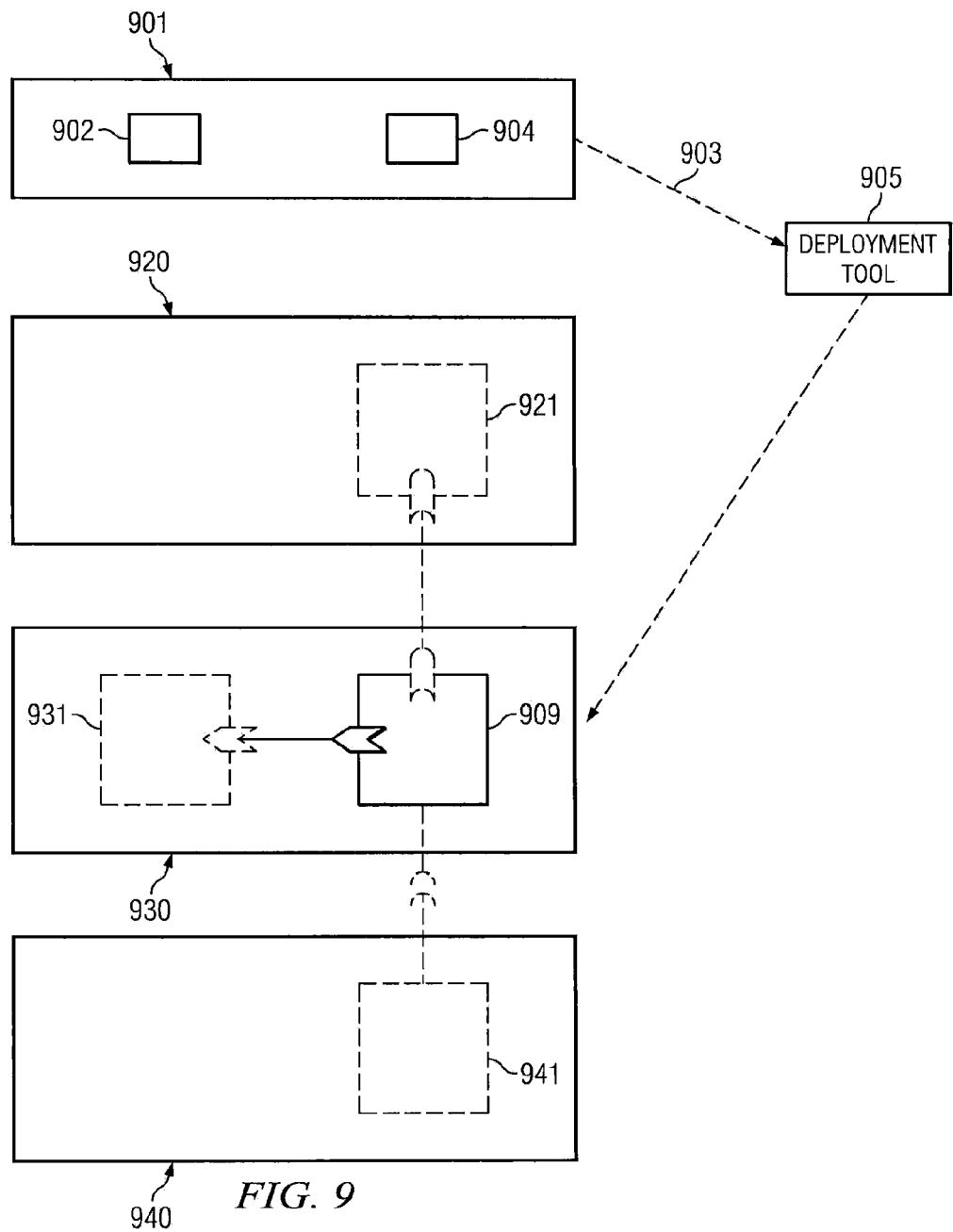
FIG. 9 is a schematic diagram illustrating application deployment in an environment with propagated capabilities, in accordance with the present disclosure.

FIG. 9 is a schematic diagram 900 illustrating application deployment in an environment with propagated capabilities. Application layer 901 includes one or more components 902, 904. The application layer 901 may express a requirement 903 for a component 909 having a plurality of capabilities. The plurality of capabilities may be provided by the component 909, or may be propagated to component 909 from other components 921, 931, 941. The related components 921, 931, 941 may be based on an extension point relationship (921), a service/reference relationship (931), and/or a factory relationship (941). A deployment tool 905 is operable to determine the component 909 that either has the plurality of capabilities itself or via propagation from other components 921, 931, 941. The components 921, 931, 941 may be located at the same or different application layers 920, 930, 940 with respect to the component 909.

By way of example only, application layer 901 may express a requirement for a first and second capability. Component 909 may provide the first capability itself, and may acquire the second capability via extension point propagation from component 921 at layer 920, service/reference point propagation from component 931 at layer 930, or factory propagation from component 941 at layer 940. Thus, component 909 may provide the required first and second capabilities to application layer 901.

FIG. 10A is a schematic diagram 1000 illustrating capability propagation for a plurality of components and a variety of capability propagation mechanisms. Component 1002 may be data deployed as a component, and component 1004 may be a factory component. Components 1002 and 1004 are related via a factory propagation relationship 1003, and capabilities of component 1002 are propagated 1050 to factory 1004. Component 1006 may use a service provided by component 1004. Thus, capabilities from component 1004 may be propagated 1050 to component 1006. Component 1008 may be extensible by component 1006. Thus, the capabilities of component 1006 may be propagated 1050 to component 1008. Because of the chain of relationships, the capabilities provided by component 1002 may be propagated to component 1008.

FIG. 10B is a schematic diagram illustrating component deployment using capability propagation mechanisms. Note that 1008 is the same component as in FIG. 10A. Component 1020 requiring parameters from component 1002, capabilities from component 1004, and/or capabilities from component 1006 may be deployed at component 1008. Component 1008 provides these capabilities through a plurality of propagation mechanisms.

FIG. 11 is a schematic diagram 1100 illustrating capability propagation. In some embodiments, capabilities may be propagated from the deploying application layer through the already deployed application layer. A deployment tool may effect this propagation.

Application 1101 includes components 1102 and 1103. Application 1106 includes components 1104 and 1105. Component 1103 provides capability 1106 and requires 1111 factory 1110. Component 1102 requires 1121 a factory 1120 with a capability 1106. Component 1105 extends component 1104 through an extension point relationship 1108. Component 1104 has a factory 1120, and component 1105 has a factory 1110.

If application 1101 were to deploy onto the application 1116, capability 1106 may be propagated from component 1103 through factory relationship 1112 to component 1105. Component 1106 may then be propagated through the extension point relationship 1108 to component 1104. Thus, component 1104 now has a factory 1120 with a capability 1106, and the deployment of application 1101 onto application 1116 would succeed.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context. Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A system for deploying an application in a deployment environment, comprising:
    a memory;
    a processor in communication with the memory; and
    a deployment module stored in the memory and executed by the processor, the deployment module operable to:
        receive a component to be deployed in the deployment environment;
        receive a description of how to deploy the component onto a logical deployment model, wherein the logical deployment model comprises a logical description of the deployment environment;
        prior to deployment of the component, analyze a plurality of deployed components to determine if one or more of the plurality of deployed components provides capabilities required by the component;
        if the capabilities required by the component are provided, generate mapping data including one or more desired attributes of the logical deployment model based on the description, map the logical deployment model to the deployment environment based on the mapping data, and automatically deploy the component to the deployment environment; and
        if the capabilities required by the component are not provided, prevent deployment of the component to the deployment environment.

2. The system of claim 1, wherein the description comprises one or more attributes required of one or more sets of machines for the component, and wherein the component is automatically deployed to one or more machines in the deployment environment having the one or more attributes.

3. The system of claim 2, wherein the deployment module is further operable to prevent deployment of the component to the deployment environment if the deployment module cannot determine one or more machines in the deployment environment having the one or more attributes.

4. The system of claim 1, wherein the deployment module is further operable to prevent deployment of the component to the deployment environment if the deployment module cannot map the logical deployment model to the deployment environment.

5. The system of claim 1, wherein the deployment environment comprises one of a networked computing environment, a cloud computing environment, and a distributed computing environment.

6. The system of claim 1, wherein the description comprises an artifact of data including attributes of nodes in the deployment environment.

7. The system of claim 1, wherein the description comprises tiered sets of attributes of nodes.

8. The system of claim 1, wherein the description comprises scalability requirements for deploying the component in the deployment environment.

9. The system of claim 1, wherein the deployment module is further operable to:

receive a plurality of components to be deployed in the deployment environment;

receive the description, wherein the description further comprises how to deploy the plurality of components onto the logical deployment model; and if the capabilities required by the component are provided, generate the mapping data including one or more desired attributes of the logical deployment model based on the description and automatically deploy the plurality of components to the deployment environment.

10. The system of claim 1, wherein the one or more desired attributes comprise at least one selected from the group consisting of:
processing speed;
a machine having over three GHz of processing power;
a memory size;
connection speed with another node;
geographic location;
a particular type of operating system;
a virtual machine;
a particular type of database;
compatibility information;
security features; and
auditing features.

11. A method for deploying an application in a deployment environment, the method comprising:
receiving, by a deployment tool, a component to be deployed in the deployment environment;
receiving, by the deployment tool, a description of how to deploy the component onto a logical deployment model, wherein the logical deployment model comprises a logical description of the deployment environment;
prior to deployment of the component, analyzing, by the deployment tool, a plurality of deployed components to determine if one or more of the plurality of deployed components provides capabilities required by the component;
if the capabilities required by the component are provided, generating, by the deployment tool, mapping data including one or more desired attributes of the logical deployment model based on the description, mapping, by the deployment tool, the logical deployment model to the deployment environment based on the mapping data, and automatically deploying, by the deployment tool, the component to the deployment environment; and
if the capabilities required by the component are not provided, preventing, by the deployment tool, deployment of the component to the deployment environment.

12. The method according to claim 11, wherein the description comprises one or more attributes required of one or more sets of machines for the component, and wherein the component is automatically deployed to one or more machines in the deployment environment having the one or more attributes.

13. The method according to claim 12, wherein the method further comprises preventing, by the deployment tool, deployment of the component to the deployment environment if the deployment tool cannot determine one or more machines in the deployment environment having the one or more attributes.

14. The method according to claim 11, wherein the method further comprises preventing, by the deployment tool, deployment of the component to the deployment environment if the deployment tool cannot map the logical deployment model to the deployment environment.

15. The method according to claim 11, wherein the deployment environment comprises one of a networked computing environment, a cloud computing environment, and a distributed computing environment.

16. The method according to claim 11, wherein the description comprises an artifact of data including attributes of nodes in the deployment environment.

17. The method according to claim 11, wherein the description comprises tiered sets of attributes of nodes.

18. The method according to claim 11, wherein the description comprises scalability requirements for deploying the component in the deployment environment.

19. The method according to claim 11, wherein the method further comprises:
receiving, by the deployment tool, a plurality of components to be deployed in the deployment environment;
receiving, by the deployment tool, the description, wherein the description further comprises how to deploy the plurality of components onto the logical deployment model; and
if the capabilities required by the component are provided, generating, by the deployment tool, the mapping data including one or more desired attributes of the logical deployment model based on the description and automatically deploying, by the deployment tool, the plurality of components to the deployment environment.

20. The method according to claim 11, wherein the one or more desired attributes comprise at least one selected from the group consisting of:
processing speed;
a machine having over three GHz of processing power;
a memory size;
connection speed with another node;
geographic location;
a particular type of operating system;
a virtual machine;
a particular type of database;
compatibility information;
security features; and
auditing features.

21. Logic for deploying an application in a deployment environment, the logic being embodied in a non-transitory computer-readable medium and when executed operable to:
receive a component to be deployed in the deployment environment;
receive a description of how to deploy the component onto a logical deployment model, wherein the logical deployment model comprises a logical description of the deployment environment;
prior to deployment of the component, analyze a plurality of deployed components to determine if one or more of the plurality of deployed components provides capabilities required by the component;
if the capabilities required by the component are provided, generate mapping data including one or more desired attributes of the logical deployment model based on the description, map the logical deployment model to the deployment environment based on the mapping data, and automatically deploy the component to the deployment environment; and
if the capabilities required by the component are not provided, prevent deployment of the component to the deployment environment.

* * * * *